United States Patent
Kishida

(10) Patent No.: US 9,981,555 B2
(45) Date of Patent: May 29, 2018

(54) STATE OF CHARGE INDICATOR OF HYBRID VEHICLE

(71) Applicant: Fuji Jukogyo Kabushiki Kaisha, Tokyo (JP)

(72) Inventor: Taichi Kishida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days. days.

(21) Appl. No.: 15/009,456

(22) Filed: Jan. 28, 2016

(65) Prior Publication Data

US 2016/0243941 A1    Aug. 25, 2016

(30) Foreign Application Priority Data

Feb. 23, 2015 (JP) ................................. 2015-032487

(51) Int. Cl.
| | |
|---|---|
| *B60Q 1/00* | (2006.01) |
| *B60K 35/00* | (2006.01) |
| *B60L 11/18* | (2006.01) |
| *B60L 15/20* | (2006.01) |

(52) U.S. Cl.
CPC .......... *B60K 35/00* (2013.01); *B60L 11/1862* (2013.01); *B60L 15/2045* (2013.01); *B60L 2250/16* (2013.01); *B60L 2260/26* (2013.01)

(58) Field of Classification Search
None
See application file for complete search history.

(56) References Cited

U.S. PATENT DOCUMENTS

| | | |
|---|---|---|
| 8,207,838 B2 | 6/2012 | Watanabe |
| 8,836,544 B1 | 9/2014 | Balogh |
| 8,922,358 B2 | 12/2014 | Handa |
| 9,254,757 B2 | 2/2016 | Yamamoto |
| 9,457,664 B2 | 10/2016 | Amano |
| 9,506,781 B2 | 11/2016 | Skaff |

(Continued)

FOREIGN PATENT DOCUMENTS

| | | |
|---|---|---|
| JP | 2008-074321 A | 4/2008 |
| JP | 2013-119349 A | 6/2013 |
| JP | 5223822 B2 | 6/2013 |

OTHER PUBLICATIONS

Japanese Office Action dated Jun. 7, 2016 with an English translation thereof.

(Continued)

*Primary Examiner* — Julie Lieu
(74) *Attorney, Agent, or Firm* — McGinn IP Law Group, PLLC.

(57) ABSTRACT

A state of charge indicator includes a first indication unit that provides an indication of a state of charge of a battery of a hybrid vehicle. The first indication unit includes a movable index and a fixed index. The movable index is movable in accordance with an increase and a decrease in the state of charge. The fixed index is disposed along a movement range of the movable index. The movable index is movable between positions corresponding to a maximum and a minimum of a state of charge range directed to an EV traveling mode and an HV traveling mode. The fixed index includes: a first sign that indicates switching from the EV traveling mode to the HV traveling mode; and a second sign that indicates switching from the HV traveling mode to the EV traveling mode.

14 Claims, 4 Drawing Sheets

(56) References Cited

U.S. PATENT DOCUMENTS

| | | | |
|---|---|---|---|
| 2009/0174538 A1* | 7/2009 | Shibata | B60K 6/48 340/438 |
| 2009/0322503 A1* | 12/2009 | Suzuki | B60K 6/445 340/438 |
| 2011/0095878 A1 | 4/2011 | Skaff | |
| 2011/0241859 A1 | 10/2011 | Handa | |
| 2012/0112754 A1 | 5/2012 | Kawai | |
| 2012/0179420 A1 | 7/2012 | Gilman | |
| 2012/0188068 A1* | 7/2012 | Hanna | B60W 50/14 340/441 |
| 2014/0138172 A1* | 5/2014 | Suzuki | B60K 6/445 180/65.21 |
| 2016/0243941 A1 | 8/2016 | Kishida | |
| 2016/0243959 A1* | 8/2016 | Kishida | B60L 11/1861 |
| 2016/0318502 A1* | 11/2016 | Suzuki | B60W 50/14 |

OTHER PUBLICATIONS

United States Office Action dated Jan. 10, 2017 in U.S. Appl. No. 15/011,280.
United States Office Action dated Jun. 28, 2017 in U.S. Appl. No. 15/011,280.

* cited by examiner

FIG. 6

STATE OF CHARGE INDICATOR OF HYBRID VEHICLE

CROSS-REFERENCE TO RELATED APPLICATIONS

The present application claims priority from Japanese Patent Application No. 2015-032487 filed on Feb. 23, 2015, the entire contents of which are hereby incorporated by reference.

BACKGROUND

The technology relates to an SOC indicator that provides an indication of an SOC of a hybrid vehicle having an EV traveling mode.

An engine-electric motor hybrid vehicle (HV) includes an engine and a motor generator as power sources for traveling, allowing for motor assistance on occasions such as acceleration by using electric power. The electric power may be generated in association with use of a regeneration brake, etc. and charged in a battery.

In recent years, such a hybrid vehicle is further provided with a function of charging from an external power supply such as a domestic power supply and a commercial power supply, attaining expansion of a range of usability of an electric vehicle (EV) traveling mode that allows for traveling with sole use of the motor generator without using the engine. This type of hybrid vehicle has been spreading as a plug-in hybrid vehicle (PHEV).

The plug-in hybrid vehicle as mentioned above may include a secondary battery such as, but not limited to, a lithium ion battery and a nickel hydrogen battery, as power storage to accumulate electric power to be used in traveling.

In such a secondary battery, a ratio of residual electric power to chargeable electric power (total capacity) is called a state of charge (SOC).

In the plug-in hybrid vehicle, SOC control (charge and discharge control) of the battery may differ as follows between the EV traveling mode that involves traveling with sole use of the motor generator and an HV traveling mode with combined use of the engine and the motor generator.

In the EV traveling mode, in many cases, traveling may be started in a range of a relatively high SOC (almost full-charged); when the SOC decreases to the extent that continuation of the EV traveling mode becomes difficult, the EV traveling mode may be switched to the HV traveling mode.

In contrast, in the HV traveling mode, the SOC control may be targeted to a relatively low SOC state; within a relatively narrow SOC range, charge (e.g., regenerative power generation) and discharge (motor drive) may be repeated with high frequency.

The plug-in hybrid vehicle as mentioned above may include an SOC indicator (a battery residual capacity indicator) in order to present information on residual capacity of the battery to a driver.

As one example of existing techniques concerning such an SOC indicator, Japanese Patent (JP-B) No. 5223822 describes a residual capacity indicator that changes display colors of a bar graph in accordance with a first traveling mode and a second traveling mode. The first traveling mode gives priority to traveling with sole use of a motor. The second traveling mode involves use of an internal combustion engine and the generator.

JP-B No. 5223822 also provides a description that, in the display in the first traveling mode, the bar graph is color-divided at a position corresponding to residual capacity where the first traveling mode is switched to the second traveling mode.

Although the existing technique as mentioned above enables a grasp of a current SOC, it provides a driver with little information on a timing when the traveling mode will be returned to the EV traveling mode again, in a case of recovery of an SOC by charging such as regenerative power generation in traveling in the HV traveling mode. Hence, it is difficult to forecast switching of traveling modes.

SUMMARY

It is desirable to provide an SOC indicator of a hybrid vehicle that allows for an intuitive grasp of a change of traveling modes in response to a current SOC and a change in SOC.

An aspect of the technology provides an SOC indicator including a first indication unit that provides an indication of an SOC of a battery of a hybrid vehicle. The first indication unit includes a movable index and a fixed index. The movable index is movable in accordance with an increase and a decrease in the SOC. The fixed index is disposed along a movement range of the movable index. The movable index is movable between positions corresponding to a maximum and a minimum of an SOC range directed to an EV traveling mode and an HV traveling mode. The EV traveling mode gives priority to driving with sole use of an electric motor. The HV traveling mode involves driving with combined use of an engine and the electric motor, and controls charge and discharge of the battery to allow the SOC to be within a prescribed range. The fixed index includes: a first sign that indicates switching from the EV traveling mode to the HV traveling mode; and a second sign that indicates switching from the HV traveling mode to the EV traveling mode.

In the SOC indicator, the fixed index may include graduations disposed at equal intervals. The graduations may include a graduation of the first sign and a graduation of the second sign. The graduation of the first sign may be in a different indication mode from an indication mode of at least one graduation, in which the at least one graduation is adjacent to the graduation of the first sign. The graduation of the second sign may be in a different indication mode from an indication mode of at least one graduation, the at least one graduation being adjacent to the graduation of the second sign.

In the SOC indicator, the fixed index may include a first region, a second region, and a third region. The first region may correspond to a state in which the SOC is higher than the second sign. The second region may correspond to a state in which the SOC is between the second sign and the first sign. The third region may correspond to a state in which the SOC is lower than the first sign. The fixed index may be in different indication modes for the first region, the second region, and the third region.

In the SOC indicator, the fixed index may include a first region, a second region, and a third region. The first region may correspond to the SOC with which the EV traveling mode is solely executed. The second region may correspond to the SOC with which both the EV traveling mode and the HV traveling mode are executed. The third region may correspond to the SOC with which the HV traveling mode is solely executed. The fixed index may be in different indication modes for the first region, the second region, and the third region.

The SOC indicator may further include a second indication unit that provides an indication of whether the EV traveling mode or the HV traveling mode is selected.

BRIEF DESCRIPTION OF THE DRAWINGS

FIG. 6 illustrates one example of transition of the SOC indication on the pointer SOC meter and the MFD in the SOC indicator according to the implementation.

DETAILED DESCRIPTION

An implementation of the technology may involve an SOC indicator that includes a pointer and a scale plate as a common indication mode for an EV traveling mode and an HV traveling mode. The scale plate may provide, for example, a color-coded indication of a switching line from the EV traveling mode to the HV traveling mode and a switching line from the HV traveling mode to the EV traveling mode.

In the following, some implementations of the technology are described in detail with reference to the drawings.

An SOC indicator of a hybrid vehicle (hereinafter simply referred to as an "SOC indicator") according to an implementation may be provided in an engine-electric motor hybrid vehicle that may be, for instance, an automobile such as, but not limited to, a passenger car, and may have a plug-in charging function and an EV traveling mode. The EV traveling mode involves traveling mainly with sole use of a motor.

Figure 1:
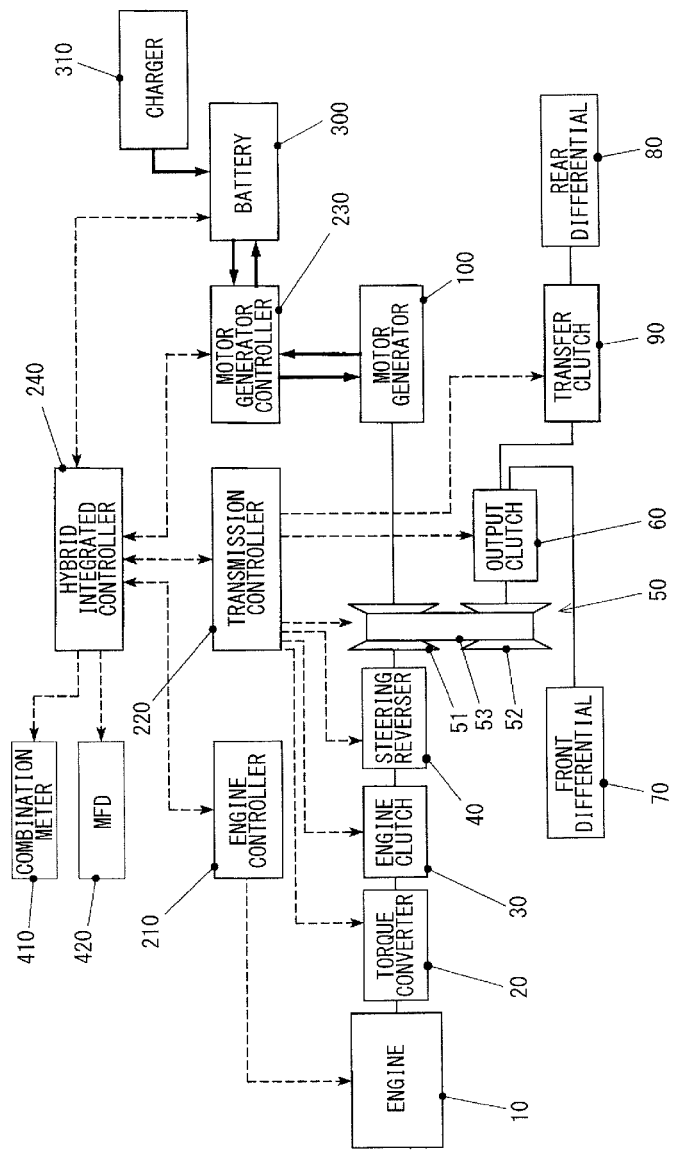
FIG. 1 is a block diagram of a schematic configuration of a power train and relevant parts of a hybrid vehicle including an SOC indicator according to an implementation of the technology.

FIG. 1 is a block diagram of a schematic configuration of a power train and relevant parts of a hybrid vehicle including the SOC indicator according to the implementation.

Referring to FIG. 1, the vehicle may be an engine-electric motor hybrid AWD vehicle including, for example, an engine 10, a torque converter 20, an engine clutch 30, a steering reverser 40, a variator 50, an output clutch 60, a front differential 70, a rear differential 80, a transfer clutch 90, a motor generator 100, an engine controller 210, a transmission controller 220, a motor generator controller 230, a hybrid integrated controller 240, a battery 300, a charger 310, a combination meter 410, and a multi-function display (MFD) 420.

The engine 10 may be an internal combustion engine used as a power source for traveling of the vehicle, together with the motor generator 100.

As the engine 10, for instance, a four-stroke gasoline engine may be used.

The engine 10 may include a main body and auxiliaries. The main body and the auxiliaries may be controlled by the engine controller 210. The engine 10 may generate output torque corresponding to request torque specified by the hybrid integrated controller 240, based on, for example, an accelerator operation by a driver.

The torque converter 20 may be a fluid coupling that transmits an output of the engine 10 to the engine clutch 30.

The torque converter 20 may serve as a starting device that allows for transmission of engine torque in a stop state of the vehicle.

The torque converter 20 may be controlled by the transmission controller 220, and may include an undepicted lock-up clutch that directly couples input side (impeller side) and output side (turbine side).

The engine clutch 30 may be provided between the torque converter 20 and the steering reverser 40, allowing for connection and disconnection of a power transmission route therebetween.

For instance, the engine clutch 30 may be disengaged in response to an instruction from the transmission controller 220 on occasions such as, but not limited to, the EV traveling mode. In the EV traveling mode, the vehicle travels with sole use of an output of the motor generator 100.

The steering reverser 40 may be provided between the engine clutch 30 and the variator 50, allowing for switching between an advance mode and a retreat mode in response to an instruction from the transmission controller 220. The advance mode may involve direct coupling of the torque converter 20 and the variator 50. The reverse mode may involve reversing a rotation output of the torque converter 20 and transmitting the reversed rotation output to the variator 50.

The steering reverser 40 may include, for instance, a planetary gear set.

The variator 50 may be a transmission mechanism that continuously changes a rotation output of the engine 10 and a rotation output of the motor generator 100. The rotation output of the engine 10 may be transmitted from the steering reverser 40.

The variator 50 may be, for instance, a chain type continuously variable transmission (CVT) including a primary pulley 51, a secondary pulley 52, and a chain 53.

The primary pulley 51 may be provided on input side of the variator 50 in driving of the vehicle, i.e., on output side in regenerative power generation. The primary pulley 51 may be supplied with the rotation outputs of the engine 10 and the motor generator 100.

The secondary pulley 52 may be provided on output side of the variator 50 in driving of the vehicle, i.e., on input side in regenerative power generation.

The secondary pulley 52 may be adjacent to the primary pulley 51 and turnable around a rotation axis that is parallel to a rotation axis of the primary pulley 51.

The chain 53 may be annularly formed and wound around the primary pulley 51 and the secondary pulley 52, allowing for power transmission therebetween.

The primary pulley 51 and the secondary pulley 52 each may include a pair of sheaves with the chain 53 interposed therebetween. The primary pulley 51 and the secondary pulley 52 each may change an interval between the pair of sheaves in response to transmission control by the transmission controller 220, allowing for a continuous change in an effective diameter.

The output clutch 60 may be provided between the secondary pulley 52 of the variator 50 and the front differential 70, and between the secondary pulley 52 of the variator 50 and the transfer clutch 90, allowing for connection and disconnection of power transmission routes therebetween.

The output clutch 60 may be normally engaged in traveling of the vehicle, and may be disengaged in stopping of the vehicle on occasions such as, but not limited to, battery charge by driving the motor generator 100 with use of the output of the engine 10.

The front differential 70 may transmit, to right and left front wheels, driving force transmitted from the output clutch 60.

The front differential 70 may include a final reduction gear and a differential mechanism. The differential mechanism absorbs a difference in rotation speeds of the right and left front wheels.

The output clutch 60 and the front differential 70 may be substantially directly coupled to each other.

The rear differential 80 may transmit, to right and left rear wheels, driving force transmitted from the output clutch 60.

The rear differential 80 may include a final reduction gear and a differential mechanism. The differential mechanism absorbs a difference in rotation speeds of the right and left rear wheels.

The transfer clutch 90 may be provided in the middle of a rear wheel driving force transmission mechanism that transmits driving force from the output clutch 60 to the rear differential 80, allowing for connection and disconnection of a power transmission route therebetween.

The transfer clutch 90 may be, for instance, hydraulic or electromagnetic wet multiplate clutch that makes it possible to continuously change fastening force in engagement, i.e., transmission torque capacity.

The fastening force of the transfer clutch 90 may be controlled by the transmission controller 220.

Changing the fastening force of the transfer clutch 90 may allow for adjustment of driving torque distribution to the front and rear wheels.

Also, the transfer clutch 90 may decrease or release the fastening force to cause a slip, allowing for absorption of a difference in rotation speeds of the front and rear wheels, when it is necessary to allow the difference in the rotation speeds of the front and rear wheels in turning the vehicle or in executing control such as, but not limited to, anti-lock brake control or vehicle behavior control.

The transfer clutch 90 may transmit, to the motor generator 100 through the output clutch 60 and the variator 50, torque inputted from rear-wheel side through the rear differential 80, etc. in energy regeneration by the motor generator 100.

The motor generator 100 may be a rotary electric machine that generates the driving force of the vehicle and performs energy regeneration by regenerative power generation with use of torque transmitted from wheel side in deceleration.

The motor generator 100 may be disposed concentrically with the primary pulley 51 of the variator 50.

The primary pulley 51 may be coupled to an undepicted rotor of the motor generator 100 through the rotation axis of the primary pulley 51.

As the motor generator 100, a permanent magnet synchronous motor may be used, for instance.

The motor generator 100 may have output torque in driving and an amount of regenerative energy (input torque) in regenerative power generation controlled by the motor generator controller 230.

The engine controller 210 may totally control the engine 10 and its auxiliaries.

The transmission controller 220 may totally control parts such as, but not limited to, the lock-up clutch of the torque converter 20, the engine clutch 30, the steering reverser 40, the variator 50, the output clutch 60, and the transfer clutch 90.

The motor generator controller 230 may control characteristics such as, but not limited to, the output torque and the amount of regenerative energy of the motor generator 100.

The hybrid integrated controller 240 may integrally control parts such as, but not limited to, the engine controller 210, the transmission controller 220, and the motor generator controller 230 in response to the request torque specified based on, for example, the acceleration operation by a driver.

Each of these units may include an information processor such as a CPU, a memory such as a RAM and a ROM, an input output interface, and a bus that couples them to one another.

Also, these units may communicate with one another through a communication system such as, but not limited to, a CAN communication system, allowing for transmission of necessary information. The CAN communication system is a kind of on-vehicle LAN system.

The hybrid integrated controller 240 may change traveling modes of the vehicle between the electric vehicle (EV) traveling mode and a hybrid vehicle (HV) traveling mode based on an SOC as remaining electric energy of the battery 300.

The EV traveling mode may be a traveling mode that involves driving the motor generator 100 with use of power of the battery 300 and gives priority to traveling with sole use of the output of the motor generator 100.

In the EV traveling mode, the engine 10 may be started to allow for traveling with combined use of engine torque, only when driver request torque is large and it is difficult for the motor generator 100 to solely generate sufficient torque.

Otherwise, the EV traveling mode may involve traveling of the vehicle with sole use of the output of the motor generator 100 with the engine clutch 30 disengaged.

The HV traveling mode may be a traveling mode that involves traveling of the vehicle with combined use of the output torque of the engine 10 and the motor generator 100.

The HV traveling mode may involve traveling of the vehicle with use of the output torque of the motor generator 100 when the driver request torque is small and there is a margin in the SOC; otherwise, the HV traveling mode may involve traveling of the vehicle with use of the output torque of the engine 10.

Also, in a region where the driver request torque is large, the HV traveling mode may involve traveling of the vehicle with combined use of the output torque of the engine 10 and the motor generator 100.

The hybrid integrated controller 240 may allow for automatic transition to the HV traveling mode when, in the EV traveling mode, the SOC of the battery 300 is lower than a predetermined first threshold.

Also, the hybrid integrated controller 240 may allow for automatic return to the EV traveling mode when, in the HV traveling mode, the SOC of the battery 300 exceeds a predetermined second threshold.

The motor generator controller 230 may supply the drive power to the motor generator 100 from the battery 300 in response to an instruction from the hybrid integrated controller 240.

The motor generator controller 230 may include, for example, an inverter and a converter. The inverter may AC-convert DC power supplied from the battery 300, and may supply the AC-converted power to the motor generator 100. The converter may DC-convert AC power supplied from the motor generator 100, and may supply the DC-converted power to the battery 300.

The battery 300 may be a power source or power storage that supplies the motor generator 100 with power for traveling.

As the battery 300, a secondary battery such as, but not limited to, a lithium ion battery and a nickel hydrogen battery may be used, for instance.

The battery 300 may include an SOC detector that detects the SOC, i.e., a percentage of the remaining power to total capacity of the battery. A detected SOC value may be transmitted to the hybrid integrated controller 240.

The battery 300 may be charged with, for instance, power generated by the motor generator 100 on occasions such as, but not limited to, use of a regenerative brake.

The battery 300 may further include a plug-in charging function that allows for charging with an external power source.

The charger 310 may charge the battery 300 with use of power supplied from an external power source such as, but not limited to, a domestic power source and a commercial power source.

The charger 310 may include, for example, a connection device to the external power source, an AC-DC converter, and a transformer.

The combination meter 410 may be an instrument panel disposed in a vehicle room and faced with a driver, for instance.

The combination meter 410 may include, for example, various instruments such as, but not limited to, a speed meter, an engine tachometer, a fuel meter, a water thermometer, and various indication lamps. The instruments and the indication lamps may be unitized in a common housing.

The combination meter 410 may include a pointer SOC meter 411 whose description is given below.

Figure 2:
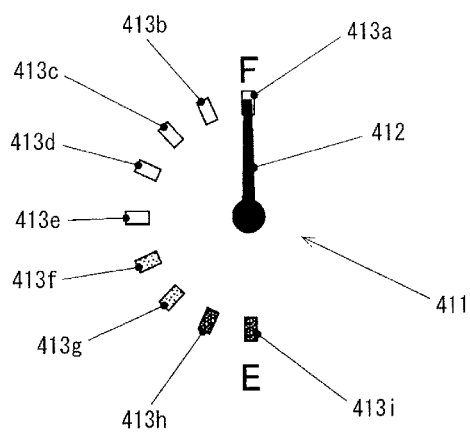
FIG. 2 illustrates a pointer SOC meter in the SOC indicator according to the implementation.

FIG. 2 illustrates the pointer SOC meter in the SOC indicator according to the implementation.

Referring to FIG. 2, the pointer SOC meter 411 may include a pointer 412 and graduations 413a to 413i.

The pointer 412 may serve as a "movable index" in one implementation of the technology. The pointer 412 may be of a rotary type, and may be swayable within an angle range of, for instance, about 180°.

The pointer 412 may point one end of a movement range (e.g. upward in an instance illustrated in FIG. 2) when the SOC of the battery 300 is a practical upper limit (e.g. 85%) in the EV traveling mode. The pointer 412 may point another end of the movement range (e.g. downward in the instance illustrated in FIG. 2) when the SOC is a practical lower limit (e.g. 15%) in the EV traveling mode and the HV traveling mode.

The graduations 413a to 413i may serve as a "fixed index" in one implementation of the technology. The graduations 413a to 413i may be provided on a dial or a scale plate as a plate member disposed behind the pointer 412 (or on farther side from a driver).

The graduations 413a to 413i may be disposed substantially along a movement locus of a tip of the pointer 412, from the one end to the other end of the movement range of the pointer 412, at substantially equal intervals in a discrete pattern. The movement locus may be shaped substantially as an arc with a central angle of 180°.

Near the uppermost graduation 413a, a letter "F" may be provided as an indication of a substantially full-charged state.

Near the lowermost graduation 413i, a letter "E" may be provided as an indication of emptiness of substantially available power.

The graduations 413a to 413i may be classified into a first group, a second group, and a third group. The first group may include the graduations 413a to 413e. The second group may include the graduations 413f and 413g. The third group may include the graduations 413h and 413i. These groups may be in different indication modes, e.g. in different indication colors from one another.

For one instance, the first group, the second group, and the third group may be respectively color-coded in green, light blue, and blue.

A region including the graduations 413a to 413e of the first group may provide an indication of a region that involves executing solely the EV traveling mode.

The pointer 412 may point the graduation 413a as an indication of a practically full-charged state. As the SOC decreases, the pointer 412 may turn counterclockwise to point the graduations 413b, 413c, 413d, and 413e sequentially.

A region including the graduations 413f and 413g of the second group may provide an indication of a region that involves executing possibly both the EV traveling mode and the HV traveling mode.

Specifically, in the EV traveling mode, when the SOC decreases and the pointer 412 points the region of the second group including the graduations 413f and 413g, the EV traveling mode may be maintained.

In the HV traveling mode, when the SOC increases and the pointer 412 points the region of the second group including the graduations 413f and 413g, the HV traveling mode may be maintained.

Here, the graduation 413f may provide an indication of an automatic return line from HV to EV at which switching (or the automatic return) from the HV traveling mode to the EV traveling mode is performed. In the HV traveling mode, when the SOC increases to a value corresponding to the graduation 413f, a change from the HV traveling mode to the EV traveling mode may be automatically performed. In one implementation of the technology, the automatic return line from HV to EV may serve as a "second sign".

A region including the graduations 413h and 413i of the third group may provide an indication of a region that involves executing solely the HV traveling mode.

Here, the graduation 413h may provide an indication of an automatic switching line from EV to HV at which switching from the EV traveling mode to the HV traveling mode is performed. In the EV traveling mode, when the SOC decreases to a value corresponding to the graduation 413h, a change from the EV traveling mode to the HV traveling mode may be automatically performed. In one implementation of the technology, the automatic switching line from EV to HV may serve as a "first sign".

The combination meter 410 may include an undepicted indicator. The indicator may be adjacent to the pointer SOC meter 411, and may provide an indication of whether the current traveling mode is the EV traveling mode or the HV traveling mode by, for instance, lighting and extinction of an icon.

The combination meter 410 may further include a predicted duration distance indicator. The predicted duration distance indicator may constantly indicate a predicted duration distance in the EV traveling mode and a predicted duration distance with combined use of the EV traveling mode and the HV traveling mode.

The MFD 420 may be an image display such as, but not limited to, an LCD. The MFD 420 may be disposed at a position to be viewed by a driver in a vehicle room.

The MFD 420 may include, for instance, a group of a number of pixels arranged in a matrix and variable in luminance and display colors, allowing any text or graphics to be displayed within its range of resolution.

The MFD 420 may be disposed, for instance, in a center region in a vehicle widthwise direction of the instrument panel and near an upper end of the instrument panel.

The MFD 420 may have, in part of its display region, a function of SOC indication that provides, for instance, bar graph display of the SOC in each of the EV traveling mode and the HV traveling mode.

The SOC indication on the MFD 420 may differ in indication modes as described below, depending on whether the EV traveling mode or the HV traveling mode is selected.

Figure 3:
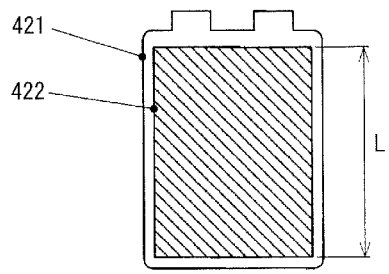
FIG. 3 illustrates an SOC indication, in an EV traveling mode, on an MFD in the SOC indicator according to the implementation.

FIG. 3 illustrates the SOC indication, in the EV traveling mode, on the MFD in the SOC indicator according to the implementation.

The MFD 420 may provide the SOC indication in the form of a bar graph whose length is variable in accordance with an increase or a decrease of the SOC. The bar graph may be superimposed on an illustration 421 of a battery.

In the EV traveling mode, as illustrated in FIG. 3, a bar graph 422 of full segment display may be displayed.

The bar graph 422 of the full segment display illustrated in FIG. 3 may be displayed in, for instance, a rectangular shape. An upper end of the bar graph 422 may be substantially continuously raised and lowered by one pixel of the group of the pixels included in the MFD 420.

In accordance with the decrease in the SOC, the upper end of the bar graph 422 may be lowered, decreasing a length L of the bar graph 422.

FIG. 3 illustrates a non-limiting example of the bar graph 422 with its upper end located on an upper end of a display range specified in advance.

At this occasion, the SOC of the battery 300 may be the practical upper limit (e.g. 85%) of the SOC use range in the EV traveling mode.

When the SOC decreases to reach the switching line from the EV traveling mode to the HV traveling mode (refer to FIG. 5 to be described later), the length of the bar graph 422 may become substantially zero, and the bar graph 422 may disappear on the MFD 420. In other words, only the illustration 421 may remain displayed on the MFD 420.

Figure 4:
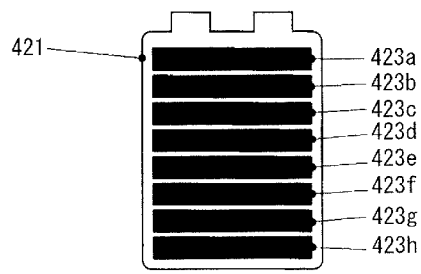
FIG. 4 illustrates an SOC indication, in an HV traveling mode, on the MFD in the SOC indicator according to the implementation.

FIG. 4 illustrates the SOC indication, in the HV traveling mode, on the MFD in the SOC indicator according to the implementation.

In the HV traveling mode, multiple (e.g. eight) segments 423a to 423h may be displayed in a sequential arrangement from top to bottom. The segments 423a to 423h may be superimposed on the illustration 421 of the battery.

In the HV traveling mode, the SOC may be indicated by the number of the segments displayed.

All of the segments 423a to 423h may be displayed near the SOC upper limit (the automatic return line from the EV traveling mode) in the HV traveling mode. As the SOC decreases, the segments 423a to 423h may disappear sequentially from the uppermost segment 423a.

When the SOC becomes near the lower limit in the HV traveling mode, all the segments 423a to 423h may disappear. In other words, only the illustration 421 may remain displayed.

Here, the bar graph 422 of the full segment display and the segments 423a to 423h of the 8-segment display may be provided in different indication modes such as, but not limited to, colors and luminance.

For instance, the bar graph 422 may be displayed in green, and the segments 423a to 423h may be displayed in blue.

The hybrid integrated controller 240 may perform calculation processing of an SOC value for the full segment display at any time. The SOC value for the full segment display may be used in the pointer SOC meter 411 and in the full segment display in the MFD 420.

The hybrid integrated controller 240 may also perform calculation processing of an SOC value for the 8-segment display. The SOC value for the 8-segment display may be used in the 8-segment display in the MFD 420.

The calculated SOC values may be received and subjected to display processing by ECUs included in the pointer SOC meter 411 and in the MFD 420.

The ECU of the MFD 420 may further receive a flag of determination on operation of the EV traveling mode and the HV traveling mode, and may perform switching between the full segment display (in the EV traveling mode) and the 8-segment display (in the HV traveling mode). The flag of determination on operation of the EV traveling mode and the HV traveling mode may be outputted from the hybrid integrated controller 240.

Description is given below on SOC transition of the battery 300 and switching operation of traveling modes in accordance with a change in the SOC, in a hybrid vehicle according to an implementation.

Figure 5:
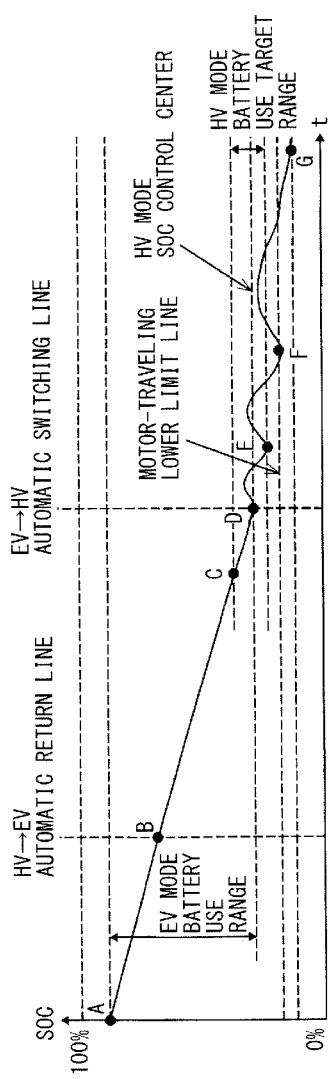
FIG. 5 illustrates one example of SOC transition and switching operation of traveling modes in the hybrid vehicle according to the implementation.

FIG. 5 illustrates one instance of the SOC transition and switching operation of traveling modes, in the hybrid vehicle according to the implementation.

In FIG. 5, a vertical axis denotes the SOC of the battery 300, and a horizontal axis denotes time.

In FIG. 5, the SOC may be, for instance, about 85% at a point A, corresponding to a practically full-charged state of the battery 300.

When traveling in the EV traveling mode is started at the state of the point A, the SOC may gradually decrease in accordance with passage of traveling time, although the SOC may be temporality recovered by regenerative power generation, etc. Power consumption due to traveling, use of electrical components, or other factors may usually exceed an amount of the regenerative power generation in braking, or any other power generation.

When the SOC passes a point B and a point C sequentially, and decreases to a level of a point D, the hybrid integrated controller 240 may automatically perform switching from the EV traveling mode to the HV traveling mode. The point B may correspond to the automatic return line from HV to EV. The point C may correspond to the upper limit of an ordinary use range of HV. The point D may correspond to the automatic switching line from EV to HV.

The automatic switching line from EV to HV may be set in a region where, for instance, the SOC substantially coincides with SOC control center in the HV traveling mode.

The automatic return line from HV to EV may be set in a region where, for instance, the predicted duration distance in the EV traveling mode after the return to the EV traveling mode is equal to or larger than a prescribed value.

In the HV traveling mode, the hybrid integrated controller 240 may perform charge and discharge control to allow the SOC of the battery 300 to be between a level corresponding to the point C and a level corresponding to a point E. The point C may be the upper limit of the ordinary use range of HV. The point E may be a lower limit of the ordinary use range of HV.

There may be cases that the SOC falls below the lower limit of the ordinary use range of HV for some reason such as, but not limited to, insufficient opportunities of regenerative power generation. In such cases, when the SOC reaches a level corresponding to a point F as a motor-traveling unallowable level, motor traveling may become difficult. Further, when the SOC reaches a level corresponding to a point G as a lower limit of a battery use range, the hybrid integrated controller 240 may drive the motor generator 100 with use of the output of the engine 10 to allow for power generation, performing control to charge the battery 300 to prevent the SOC from further decreasing.

Figure 6:
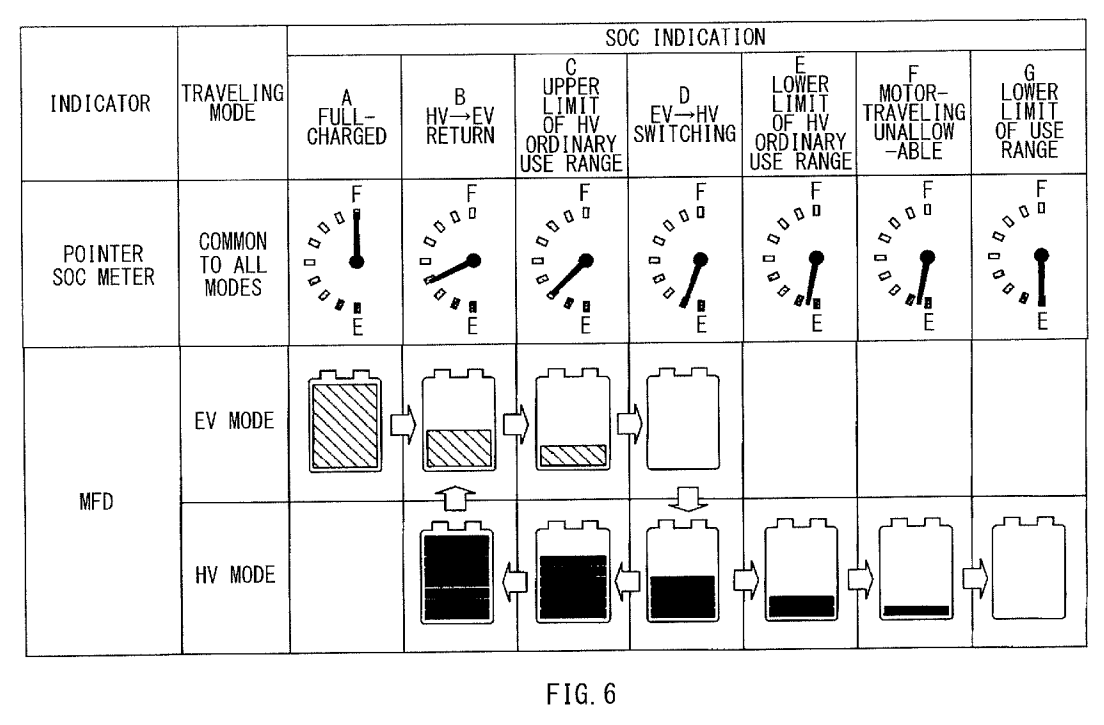

FIG. 6 illustrates one instance of transition of the SOC indication of the pointer SOC meter and the MFD in the SOC indicator according to the implementation.

In FIG. 6, columns A to G respectively correspond to the points A to G in FIG. 5 as described above.

The pointer SOC meter 411 may maintain a common indication mode over all of the columns A to G, and may provide the SOC indication solely by a positional change or sway of the pointer 412.

In a state of the column A, the pointer 412 may point the graduation 413a that indicates the full-charged state.

The pointer 412 may start here to turn counterclockwise in accordance with the decrease in the SOC. In a state of the column B, the pointer 412 may point the graduation 413f that indicates the automatic return line from the HV traveling mode to the EV traveling mode.

In a state of the column C, the pointer 412 may point the graduation 413g that indicates the upper limit of the ordinary use range of HV.

In a state of the column D, the pointer 412 may point the graduation 413h that indicates the automatic switching line from the EV traveling mode to the HV traveling mode.

At this occasion, a driver may forecast, based on how the pointer 412 comes close to the graduation 413h, switching from the EV traveling mode to the HV traveling mode.

With a further decrease in the SOC, in states of the columns E and F, the pointer 412 may shift toward the graduation 413i. In a state of the column G, the pointer 412 may point the graduation 413i.

In a case of an increase of the SOC, the pointer 412 may turn clockwise to point a position corresponding to the current SOC.

The SOC indication on the MFD 420 in the state of the column A (in the EV traveling mode) may be the full segment display as illustrated in FIG. 3, where the length or height of the bar graph 422 may be at its maximum.

The length of the bar graph 422 may start here to decrease continuously with the decrease in the SOC. The bar graph 422 may disappear in the state of the column D as the automatic switching line from the EV traveling mode to the HV traveling mode.

In a case of automatic switching from the EV traveling mode to the HV traveling mode, prior to the switching, the bar graph 422 may be set to disappear for a prescribed period.

When switching from the EV traveling mode to the HV traveling mode is performed, the SOC indication on the MFD 420 may be changed to the 8-segment display illustrated in FIG. 4.

In the state of the column D, i.e. immediately after the switching to the HV traveling mode, the segments 423e to 423h may be displayed. At this occasion, the segments 423a to 423d may disappear.

When the SOC starts here to decrease, the segment 423e and the segment 423f may disappear sequentially. In the state of the column E, the segments 423g and 423h may be displayed.

With a further decrease in the SOC, in the state of the column F, the segment 423g may disappear, and the segment 423h may be displayed.

With a further decrease in the SOC, in the state of the column G, all of the segments 423a to 423h may disappear.

In the state of the column D, when the SOC increases due to regenerative power generation, etc., the segments 423d, 423c, 423b, and 423a may be sequentially displayed.

In the state of the column C, the segments 423c to 423h may be displayed.

In the state of the column B as the automatic return line from the HV traveling mode to the EV traveling mode, all of the segments 423a to 423h may be displayed.

In a case of the automatic return (switching) from the HV traveling mode to the EV traveling mode, prior to the switching, all of the segments 423a to 423h may be set to be displayed for a prescribed period.

When the switching from the HV traveling mode to the EV traveling mode is performed, the SOC indication on the MFD 420 may be returned to the full segment display, and a lower part of the bar graph 422 with one-third of its length may be displayed.

As described above, according to the implementation, with the position of the tip of the pointer 412, it is possible to grasp the SOC of the battery 300 intuitively and easily.

Further, in the EV traveling mode, it is possible to grasp switching time to the HV traveling mode, based on how the tip of the pointer 412 comes close to the graduation 413h. In the HV traveling mode, it is possible to grasp switching time to the EV traveling mode, based on how the tip of the pointer 412 comes close to the graduation 413f.

Also, the graduations 413a to 413i may be color-coded according to regions, i.e. the region where the EV traveling mode is selected, the region where the HV traveling mode is selected, and the region where both of the traveling modes are selected. This makes it possible for a driver to grasp a vehicle state more easily.

Moreover, the pointer SOC meter 411 includes the mechanical pointer 412 and the scale plate including the graduations 413a to 413i. Hence, it is possible to provide an SOC indicator that has good visibility and allows for intuitive visual confirmation with a simple configuration.

In addition, the currently-selected traveling mode may be displayed on the combination meter 410 with use of an icon or any other symbol. This makes it possible to easily determine which traveling mode is currently selected, even when an indication value of the pointer SOC meter 411 is in an intermediate region between the switching lines of the traveling modes.

As described above, according to the implementation, it is possible to provide an SOC indicator of a hybrid vehicle that allows for an intuitive grasp of a change of traveling modes in response to a current SOC and a change in SOC.

(Modifications)

The technology is by no means limited to the implementations described above. The technology may be modified or altered in a variety of ways, and is intended to include such modifications and alterations.

First, configurations of a hybrid vehicle and an SOC indicator are not limited to the implementations described above, and may be modified as appropriate.

For instance, in the foregoing description, described is one implementation in which the vehicle is a plug-in hybrid vehicle having a plug-in charging function. However, the technology may be applied to a vehicle that has an EV traveling mode, i.e., a function of traveling with sole use of a motor generator without starting an engine, even when the vehicle has no plug-in charging function.

Also, the engine is not limited to a gasoline engine as described in the forgoing implementation. A diesel engine or any other internal combustion engine may be used.

Second, the pointer SOC meter in the forgoing implementation includes a mechanical pointer and a scale plate. Instead, an image corresponding to such a pointer SOC meter may be displayed on an image display such as, but not limited to, an LCD.

Also, in the forgoing implementation, the three regions are provided with graduations in the respective three colors. However, the intermediate region may be provided in gradation or in a separately-colored pattern in multiple colors. In this case, one end of the gradationed region, or one end of the separately-colored-patterned region may serve as a "first sign". Another end of the gradationed region, or another end of the separately-colored-patterned region may serve as a "second sign".

Alternatively, the region above a "first sign" and the region below a "second sign" may be provided in different colors from each other. The intermediate region may be provided by superimposing or overlapping both of the two colors.

Moreover, graduations that may serve as a "first sign" and a "second sign" may be provided in a different indication mode from that of other graduations. For instance, the graduations that may serve as a "first sign" and a "second sign" may be provided in a different style, e.g. in a thicker or larger style.

Furthermore, solely an indication of a threshold or thresholds may be provided on a scale plate.

Third, the SOC indication on the MFD in the forgoing implementation involves the full segment display in the EV traveling mode and the 8-segment display in the HV traveling mode. However, separate use of plural segment display and the full segment display is not limited to the forgoing implementation, and may be modified as appropriate.

For instance, the full segment display may be used in both the EV traveling mode and the HV traveling mode. Alternatively, the plural segment display may be used in both the EV traveling mode and the HV traveling mode.

Also, the number of segments in the plural segment display is not limited to eight as in the forgoing implementation. The number of segments may be increased or reduced as appropriate.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A state of charge indicator, comprising
a first indication unit that provides an indication of a state of charge of a battery of a hybrid vehicle (HV), the first indication unit including a movable index and a fixed index, the movable index being movable in accordance with an increase and a decrease in the state of charge, and the fixed index being disposed along a movement range of the movable index,
wherein the movable index is movable between positions corresponding to a maximum and a minimum of a state of charge range directed to an electric vehicle (EV) traveling mode and an HV traveling mode, the EV traveling mode giving a priority to driving with a sole use of an electric motor, and the HV traveling mode involving driving with a combined use of an engine and the electric motor, and controlling a charge and discharge of the battery to allow the state of charge to be within a prescribed range,
wherein the fixed index includes:
a first sign that indicates a switching from the EV traveling mode to the HV traveling mode; and
a second sign that indicates a switching from the HV traveling mode to the EV traveling mode,
wherein the fixed index includes graduations disposed at equal intervals, the graduations including a graduation of the first sign and a graduation of the second sign,
wherein the graduation of the first sign is in a different indication mode from an indication mode of at least one graduation, the at least one graduation being adjacent to the graduation of the first sign, and
wherein the graduation of the second sign is in a different indication mode from the indication mode of the at least one graduation, the at least one graduation being adjacent to the graduation of the second sign.

2. The state of charge indicator according to claim 1, wherein the regions of the fixed index include a first region, a second region, and a third region, the first region corresponding to a state in which the state of charge is higher than the second sign, the second region corresponding to a state in which the state of charge is between the second sign and the first sign, and the third region corresponding to a state in which the state of charge is lower than the first sign, and
wherein the fixed index is in different indication modes for the first region, the second region, and the third region.

3. The state of charge indicator according to claim 1, wherein the regions of the fixed index include a first region, a second region, and a third region the first region corresponding to the state of charge with which the EV traveling mode is solely executed, the second region corresponding to the state of charge with which both the EV traveling mode and the HV traveling mode are executed, and the third region corresponding to the state of charge with which the HV traveling mode is solely executed, and
wherein the fixed index is in different indication modes for the first region, the second region, and the third region.

4. The state of charge indicator according to claim 1, further comprising a second indication unit that provides an indication of whether the EV traveling mode or the HV traveling mode is selected.

5. The state of charge indicator according to claim 2, further comprising a second indication unit that provides an indication of whether the EV traveling mode or the HV traveling mode is selected.

6. The state of charge indicator according to claim 3, further comprising a second indication unit that provides an indication of whether the EV traveling mode or the HV traveling mode is selected.

7. The state of charge indicator according to claim 1, wherein regions of the fixed index include a first region and a second region, the first region corresponding to a state in which the state of charge is higher than the second sign, and the second region corresponding to a state in which the state of charge is between the second sign and the first sign.

8. The state of charge indicator according to claim 7, wherein the fixed index is in different indication modes for the first region and the second region.

9. The state of charge indicator according to claim 7, wherein the regions of the fixed index further include a third region corresponding to a state in which the state of charge is lower than the first sign.

10. The state of charge indicator according to claim 1, wherein regions of the fixed index include a first region and a second region, the first region corresponding to the state of charge with which the EV traveling mode is solely executed, and the second region corresponding to the state of charge with which both the EV traveling mode and the HV traveling mode are executed.

11. The state of charge indicator according to claim 10, wherein the regions of the fixed index further include a third region corresponding to the state of charge with which the HV traveling mode is solely executed.

12. The state of charge indicator according to claim 10, wherein the fixed index is in different indication modes for the first region and the second region.

13. A state of charge indicator, comprising
a first indication unit that provides an indication of a state of charge of a battery of a hybrid vehicle (HV), the first indication unit including a movable index and a fixed index, the movable index being movable in accordance with an increase and a decrease in the state of charge, and the fixed index being disposed along a movement range of the movable index,
wherein the movable index is movable between positions corresponding to a maximum and a minimum of a state of charge range directed to an electric vehicle (EV) traveling mode and an HV traveling mode, the EV traveling mode giving a priority to driving with a sole use of an electric motor, and the HV traveling mode involving driving with a combined use of an engine and the electric motor, and controlling a charge and discharge of the battery to allow the state of charge to be within a prescribed range,
wherein the fixed index includes:
a first sign that indicates a switching from the EV traveling mode to the HV traveling mode; and
a second sign that indicates a switching from the HV traveling mode to the EV traveling mode,
wherein regions of the fixed index include a first region, a second region, and a third region, the first region corresponding to a state in which the state of charge is higher than the second sign, the second region corresponding to a state in which the state of charge is between the second sign and the first sign, and the third region corresponding to a state in which the state of charge is lower than the first sign, and
wherein the fixed index is in different indication modes for the first region, the second region, and the third region.

14. A state of charge indicator, comprising
a first indication unit that provides an indication of a state of charge of a battery of a hybrid vehicle (HV), the first indication unit including a movable index and a fixed index, the movable index being movable in accordance with an increase and a decrease in the state of charge, and the fixed index being disposed along a movement range of the movable index,
wherein the movable index is movable between positions corresponding to a maximum and a minimum of a state of charge range directed to an electric vehicle (EV) traveling mode and an HV traveling mode, the EV traveling mode giving a priority to driving with a sole use of an electric motor, and the HV traveling mode involving driving with a combined use of an engine and the electric motor, and controlling a charge and discharge of the battery to allow the state of charge to be within a prescribed range,
wherein the fixed index includes:
a first sign that indicates a switching from the EV traveling mode to the HV traveling mode; and
a second sign that indicates a switching from the HV traveling mode to the EV traveling mode,
wherein regions of the fixed index include a first region, a second region, and a third region, the first region corresponding to the state of charge with which the EV traveling mode is solely executed, the second region corresponding to the state of charge with which both the EV traveling mode and the HV traveling mode are executed, and the third region corresponding to the state of charge with which the HV traveling mode is solely executed, and
wherein the fixed index is in different indication modes for the first region, the second region, and the third region.

* * * * *